Aug. 19, 1930.  E. HERKT  1,773,226

INTERNAL COMBUSTION ENGINE

Filed July 13, 1928

Inventor
Ernst Herkt
By Knight Bro
attys

Patented Aug. 19, 1930

1,773,226

UNITED STATES PATENT OFFICE

ERNST HERKT, OF KIEL, GERMANY, ASSIGNOR TO FRIED. KRUPP GERMANIAWERFT AKTIENGESELLSCHAFT, OF KIEL-GAARDEN, GERMANY

INTERNAL-COMBUSTION ENGINE

Application filed July 13, 1928, Serial No. 292,516, and in Germany August 1, 1927.

Compressorless internal combustion engines suffer from the drawback, that only an imperfect mixing of the air with the fuel takes place within the short period of time at disposal between the commencement of the injection and the combustion, whereby a retardation of the combustion (afterburning) and a reduction of the efficiency is caused. As well known, these disadvantages may be considerably reduced by imparting to the combustion air the fuel is to be injected into, a rapid motion by causing it e. g. to execute a rotary motion in the cylinder.

With known arrangements the combustion air is set in motion previous to the beginning of the compression. This affords however the drawback of the combustion air having already considerably lost its energy of motion, when the fuel injection takes place.

It has further already been proposed to impart to the combustion air the rotary motion only after the compression has been almost completed, and to use to this end an inlet valve disposed in the cylinder cover and provided with a deflecting plate. These deflecting valves, however, are hardly adapted to produce a systematic rotation of the combustion air, because the air first enters in parallel to the axis of the cylinder and, to obtain the rotary motion, it must be deflected by force rectangularly into the horizontal plane in which the rotary motion should take place. This deflection, however, unavoidably causes violent eddies and losses of energy, so that the effect is doubtful and must at least be attained at the price of a large expenditure of air.

The present invention consists primarily in an arrangement whereby the introduction of the additional air that causes the rotary motion takes place during a determined section of the compression period through a series of additional inlet ports that as far as possible open tangentially into the cylinder and to which compressed air is supplied by means of a separately controlled member.

Figure 1:
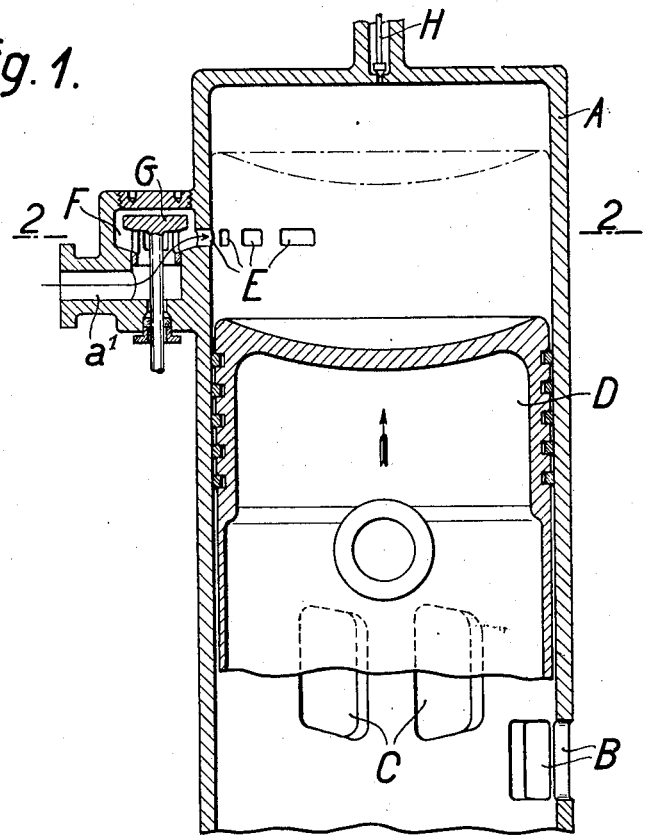
Figure 2:
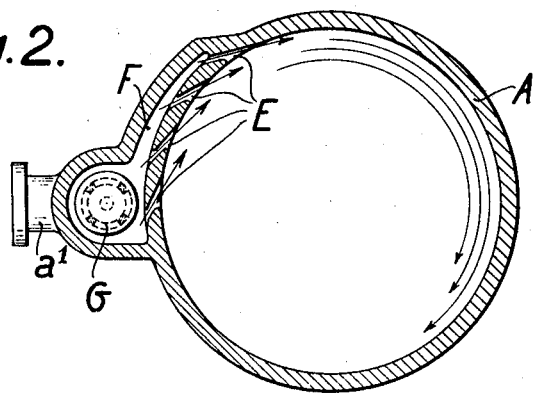

In order to allow of the invention to be more easily understood, an embodiment of the subject-matter of the same is illustrated by way of example in the drawing, in which Figure 1 is an axial longitudinal section through the parts in consideration of a two stroke internal combustion engine designed according to the invention, and Figure 2 is a section on line 2—2 of Figure 1.

Referring to these figures, A denotes the cylinder in the wall of which are provided inlet ports B for the scavenging air and outlet ports C for the burnt gases, which ports are controlled by the piston D. Furthermore a series of ports E is provided according to the invention, that serve to introduce tangentially air under pressure, in order to provoke a rotary motion of the cylinder content. To this end the ports E are as far as possible directed tangentially to the circumference of the cylinder and have the narrowest possible dimensions, to produce a great velocity of the air. Besides, it will be of advantage to design these ports as nozzles. The supply of the air under pressure to be introduced through the ports E is entered through a socket $a^1$ that opens into a feeding channel F comprising the ports E. The channel F is as narrow as possible, so that the expansion room is not notably increased by it, upon the piston returning. A controlled valve G is arranged in the channel F, which valve regulates the supply of compressed air provoking said rotary motion. The tension of this air must be somewhat higher than the pressure of the compression prevailing at the level of the ports E. H denotes the fuel injecting valve.

After the cylinder has been scavenged through the ports B and C, the piston D is on the upward stroke and compresses the freshly supplied charging air. When the piston reaches about the position illustrated in Figure 1, the controlled valve G opens and air under corresponding pressure tangentially enters the cylinder through the ports E. The air content of the combustion room is thereby set in rapid rotation and the fuel is injected into this rotating combustion air near the upper dead center position of the piston, whereby a satisfying intermixing of combustion air and fuel is warranted. The ports E are first covered by the piston D and thereupon the air supply is cut off by the valve G. When, as might be required for some reason, the ports E are arranged at so high a level, that they are not reached by the piston, then the air supply is cut off merely by valve G.

In comparison with known two stroke engines in which the scavenging air inlet ports at the same time provoke the rotary motion, the arrangement of tangential ports E in the upper portion of the cylinder according to the invention affords the great advantage of the rotary motion prevailing still to its full extent when the fuel is ejected. Over the further known engines, in which the compressed air required to produce the rotary motion is introduced by means of a deflecting valve, the described arrangement affords the advantage of the air being tangentially introduced in the cylinder in a manner correctly corresponding to the laws of flow without shocks and at a great initial velocity. Besides, a very economical air consumption is obtained.

The described arrangement will be employed primarily with two stroke internal combustion engines scavenged through ports, it may however be used without difficulty also in other engines.

What I claim, is:—

1. In a compressorless internal combustion engine means for supplying to the cylinder combustion air and fuel, and means for supplying during the last part of the compression period additional air under pressure to the cylinder, said last-named means comprising ports near the fuel supply means and adapted to supply said additional air in a direction so as to be crossed by the injected fuel jet, and a means for controlling the air supply through said ports.

2. In a compressorless internal combustion engine means for supplying to the cylinder combustion air and for supplying fuel in a direction towards the piston, and means for supplying during the last part of the compression period additional air under pressure to the cylinder, said last named means comprising ports near the fuel supply means and directed about tangentially to the cylinder wall, and a means for controlling the air supply through said ports.

3. In a compressorless internal combustion engine means for supplying to the cylinder combustion air and for supplying fuel in a direction towards the piston, and means for supplying during the last part of the compression period additional air under pressure to the cylinder, said last-named means comprising nozzle-shaped ports near the fuel supply means and directed about tangentially to the cylinder wall, and a means for controlling the air supply through said ports.

4. In a compressorless internal combustion engine means for supplying to the cylinder combustion air and for supplying fuel in a direction towards the piston, and means for supplying during the last part of the compression period additional air under pressure to the cylinder, said last-named means comprising ports near the fuel supply means and directed about tangentially to the cylinder wall and arranged so as to be covered by the piston only shortly before the compression is completed, and a means for controlling the air supply through said ports.

The foregoing specification signed at Hamburg, Germany, this 22nd day of June, 1928.

ERNST HERKT.